US009664222B2

(12) United States Patent
Evitt

(10) Patent No.: US 9,664,222 B2
(45) Date of Patent: May 30, 2017

(54) CONNECTOR FOR USE IN DISPLAY FRAMES

(75) Inventor: Jonathan Henry Strevens Evitt, London (GB)

(73) Assignee: TECNA DISPLAY LIMITED, London (GB)

( * ) Notice: Subject to any disclaimer, the term of this patent is extended or adjusted under 35 U.S.C. 154(b) by 1851 days.

(21) Appl. No.: 12/515,823

(22) PCT Filed: Nov. 19, 2007

(86) PCT No.: PCT/GB2007/004377
§ 371 (c)(1),
(2), (4) Date: Sep. 14, 2011

(87) PCT Pub. No.: WO2008/062161
PCT Pub. Date: May 29, 2008

(65) Prior Publication Data
US 2012/0009013 A1    Jan. 12, 2012

(30) Foreign Application Priority Data
Nov. 23, 2006   (GB) .................................. 0623361.3

(51) Int. Cl.
*A47B 47/00* (2006.01)
*F16B 21/09* (2006.01)
(Continued)

(52) U.S. Cl.
CPC ............ *F16B 21/09* (2013.01); *A47B 47/005* (2013.01); *A47B 47/0016* (2013.01);
(Continued)

(58) Field of Classification Search
USPC ....... 403/170–176, 178, 217, 218, 348, 349, 403/350; 446/108, 204; 52/655.1, 655.2
See application file for complete search history.

(56) References Cited

U.S. PATENT DOCUMENTS 3,834,549 A * 9/1974 Burg et al. .................... 211/189
3,982,841 A    9/1976 Endzweig
(Continued)

FOREIGN PATENT DOCUMENTS

EP        0187100     7/1986
WO     WO 99/22834    5/1999

OTHER PUBLICATIONS

International Search Report from PCT/GB2007/004377, dated Mar. 26, 2008, 3 pages.

*Primary Examiner* — Joshua Kennedy
(74) *Attorney, Agent, or Firm* — Donald E. Stout; Stout, Uxa & Buyan, LLP

(57) ABSTRACT

The connector is intended for use in displays of the kind which include a display frame formed of a plurality of beams) which are joined together by multi-way node fittings to form a three-dimensional shape, and display panels are releasably secured to the beams. The connector includes a male fitting which has a stem projecting from a plate, and a head comprising four noses which project laterally from the stem. The head is inserted in a correspondingly-shaped aperture of a female node fitting and rotated into positive engagement with the inner face of the node fitting. The trailing faces of the four noses have oppositely-inclined ramps which act to provide progressive tightening and alignment of the connector as the male part is rotated within aperture.

17 Claims, 5 Drawing Sheets

(51) Int. Cl.
*E04B 1/58* (2006.01)
*F16B 7/04* (2006.01)
*E04B 1/19* (2006.01)

(52) U.S. Cl.
CPC ............ *E04B 1/5831* (2013.01); *F16B 7/048* (2013.01); *F16B 7/0426* (2013.01); *E04B 1/1912* (2013.01); *Y10T 403/7007* (2015.01)

(56) References Cited

U.S. PATENT DOCUMENTS

| | | | | |
|---|---|---|---|---|
| 4,012,153 | A | * | 3/1977 | Pidgeon et al. .............. 403/170 |
| 4,065,890 | A | * | 1/1978 | Fenner .............................. 52/27 |
| D257,366 | S | * | 10/1980 | Gabriel ....................... D21/502 |
| 4,646,503 | A | * | 3/1987 | Brullmann et al. ............ 52/646 |
| 4,766,712 | A | * | 8/1988 | Hale ............................... 52/645 |
| 4,932,916 | A | * | 6/1990 | Blickle ......................... 446/124 |
| 5,690,446 | A | * | 11/1997 | Poissant et al. .............. 403/361 |
| 6,044,990 | A | * | 4/2000 | Palmeri ......................... 211/189 |
| 6,595,825 | B1 | * | 7/2003 | De Wilde ..................... 446/102 |
| 6,622,447 | B1 | | 9/2003 | Kessler |
| 6,966,813 | B2 | * | 11/2005 | Donahue ......................... 446/85 |
| 6,969,211 | B2 | * | 11/2005 | Altman ...................... 403/374.4 |
| 7,481,692 | B2 | * | 1/2009 | Bruder .......................... 446/122 |
| 7,491,025 | B2 | * | 2/2009 | Tangeman et al. ........... 411/553 |
| 7,537,409 | B2 | * | 5/2009 | Huhnerbein ................. 403/348 |
| D600,291 | S | * | 9/2009 | Christensen et al. ........ D21/501 |
| D614,481 | S | * | 4/2010 | Lewis ............................ D8/382 |
| 8,177,455 | B2 | * | 5/2012 | Zirin et al. .................... 403/348 |
| 2008/0267696 | A1 | * | 10/2008 | De Wilde ..................... 403/170 |

\* cited by examiner

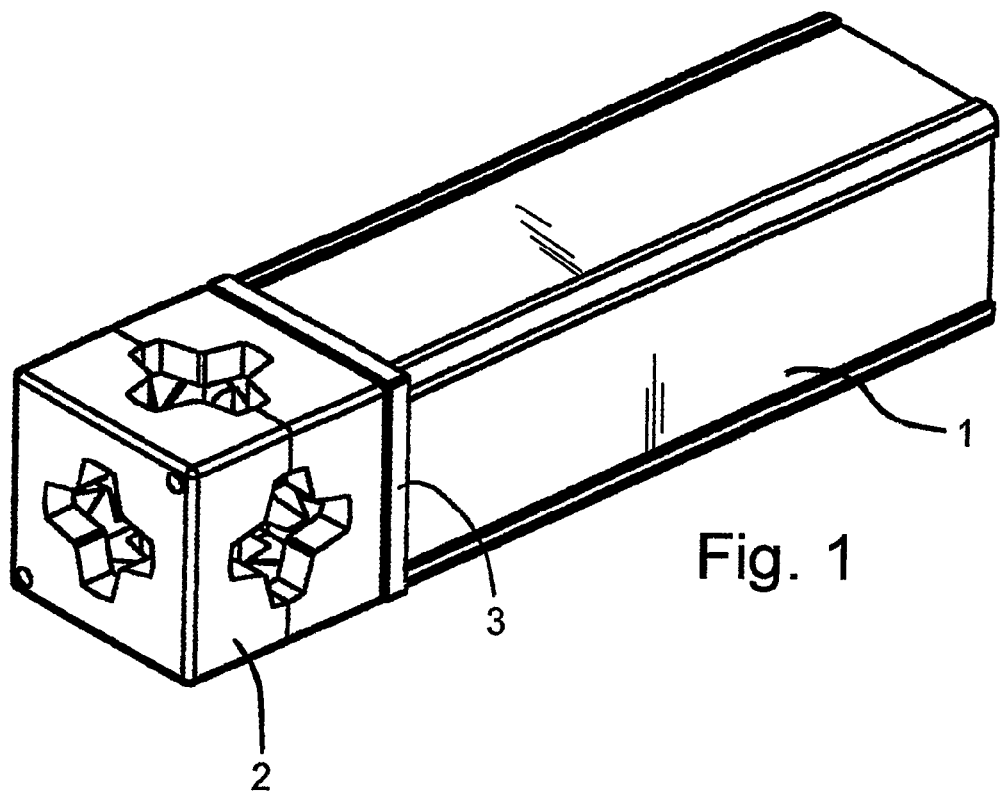
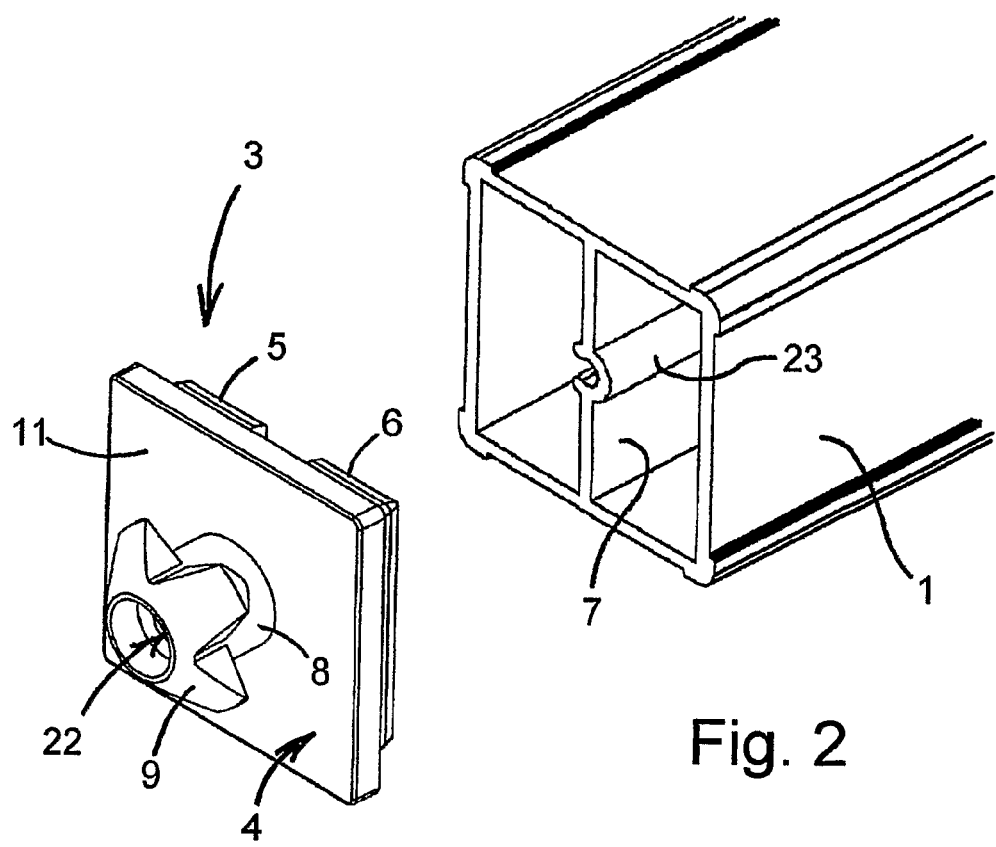

CONNECTOR FOR USE IN DISPLAY FRAMES

This application claims priority to PCT International Application No. PCT/GB2007/004377, having an international filing date of Nov. 19, 2007, and entitled CONNECTOR FOR USE IN DISPLAY FRAMES. This application also claims priority to Great Britain Application No. 0623361.3 filed on Nov. 23, 2006, both of which are incorporated herein by reference.

TECHNICAL FIELD OF THE INVENTION

This invention relates to displays of the kind which include a display frame formed of a plurality of beams which are joined together by multi-way node fittings to form a three-dimensional shape, and in which display panels are releasably secured to the beams.

BACKGROUND

In known displays of this kind the ends of the beams are provided with male bayonet fittings which are inserted into the female node fittings. The bayonet part of the fitting is substantially T-shaped. The cross-piece of the T is inserted through an elongate aperture in the female part and rotated through 90° into a detent position to releasably lock the beam to the node fitting. Whilst such connectors have been used successfully for many years the existing system has been found to possess a number of shortcomings.

1. During construction of the display considerable attention must be paid to the orientation of the node fittings and beams to ensure that they all interconnect in the desired manner. This takes up a considerable amount of time and pre-planning, and requires skill and experience on the part of the display erectors.

2. In order to ensure that a tight rigid joint is achieved the connectors must be designed such that a significant amount of force is necessary to rotate the bayonet fitting. Furthermore, if the connectors should become worn or damaged following a prolonged period of use the connection could become slack, reducing the overall stability of the display frame.

3. It is not immediately obvious whether the beams are securely attached to the node fittings since the external appearance is very similar whether the beams are rotated into the locking position or not.

4. The requirement to rotate the beams through a relatively large angle is sometimes difficult when access is restricted.

5. The weight of the display is attaining greater significance with the need to reduce transportation costs and ensure greater public safety. Although the existing system uses aluminium extruded beams it is necessary to fix steel tape on at least two sides of the beam to which the display panels can be magnetically attached.

U.S. Pat. No. 4,646,503 discloses a display connector in which the male bayonet fitting has a cruciform (cross-shaped) head which is rotatably inserted into a square aperture in the female node fittings. The joint is tightened by means of locking wedges which are operated by means of jackscrews. Although this requires a smaller angle of rotation with a minimum amount of force a secure joint is only achieved if the jack screws are adequately tightened, and there is no visual indication that this has been done. Furthermore, a large number of components are required, making the system expensive and unreliable.

The present invention seeks to provide a new and inventive form of connector for use in the construction of such displays which avoids the above disadvantages, reducing the need for consideration and pre-planning of the build, reducing the overall construction time, minimising the weight, and generally increasing the ease of construction.

SUMMARY OF THE INVENTION

The present invention proposes a connector for use in displays of the kind which include a display frame formed of a plurality of beams which are joined together by multi-way node fittings to form a three-dimensional shape, and display panels are releasably secured to the beams, in which the said connector comprises:

a male part having a bearing face, a stem projecting from the bearing face, and a head comprising four noses which project laterally from the stem;

and a female part having a wall with an inner face and an outer bearing face, the wall containing an aperture which permits the head of the male part to pass through the aperture and rotatably receives the stem with the bearing face of the male part in contact with the outer bearing face of the wall, the inner face of the wall being profiled to engage the said noses when the male part is rotated within the aperture;

characterised in that the aperture of the female part is of cruciform shape, and the opposing faces of the wall and the noses are provided with oppositely inclined ramps which act to provide progressive tightening and alignment of the connector as the male part is rotated within the aperture.

In one form of the connector the bearing face of the male part is provided by a plate adapted to engage an end of a beam forming part of the display frame. In another form of the connector the stem contains a screw-treaded socket which opens through the plate to receive a screw-threaded element.

The female part generally includes a plurality of walls which each contain such an aperture. The invention also provides a cap for engagement with any unused apertures of the female part.

BRIEF DESCRIPTION OF THE DRAWINGS

The following description and the accompanying drawings referred to therein are included by way of non-limiting example in order to illustrate how the invention may be put into practice. In the drawings:

FIG. 1 is a general view of part of a display which comprises a connector in accordance with the invention;

FIG. 2 is a general view of a male fitting forming one part of the connector, together with its associated beam;

and

Figure 10:
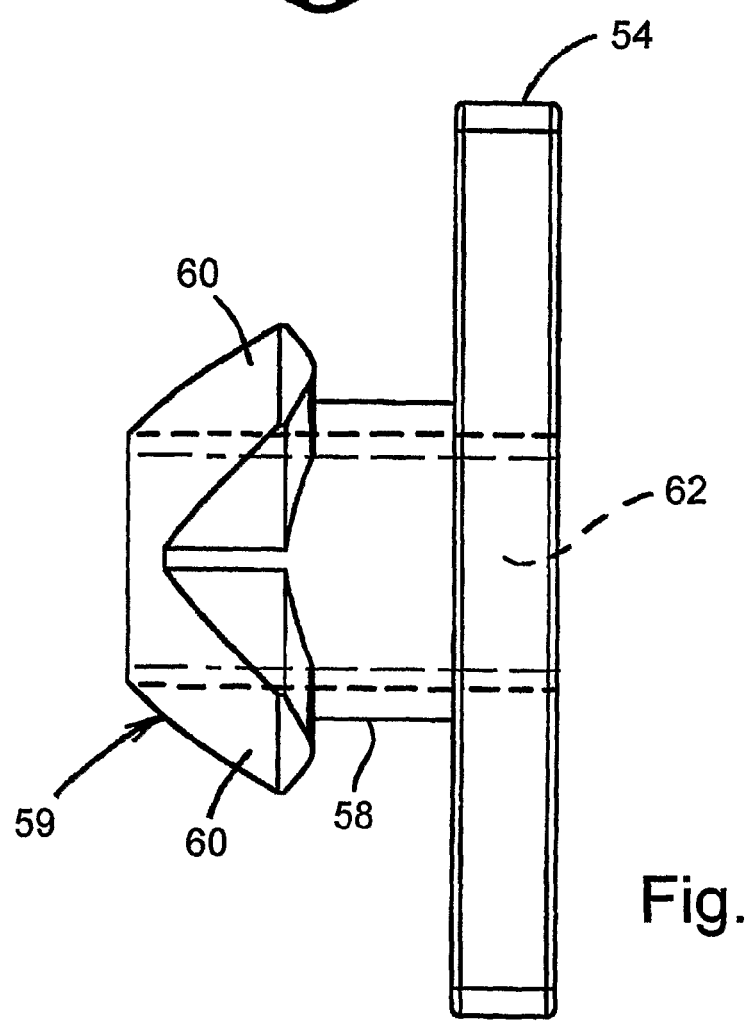

FIG. 10 is a side view of a second form of node fitting which permits the attachment of different accessories to the node fittings.

DETAILED DESCRIPTION OF THE DRAWINGS

The two-part connector which is shown in FIG. 1 is intended for use in temporary or semi-permanent displays of the kind which are often erected at exhibitions, in foyers or in other public places. The display is based on a display frame formed of extruded beams 1 which are joined together by multi-way node fittings 2 to form a three-dimensional shape to which display panels (not shown) are releasably secured using magnetic strips or the like. The ends of the beams 1 are provided with male end fittings 3 which releasably engage the female node fittings 2. The node fittings are essentially cuboidal so that they are each adapted to engage up to six male fittings, one on each face, allowing up to six beams to be orthogonally secured to each node fitting. In this way, complex three-dimensional structures can be constructed.

Figure 3:
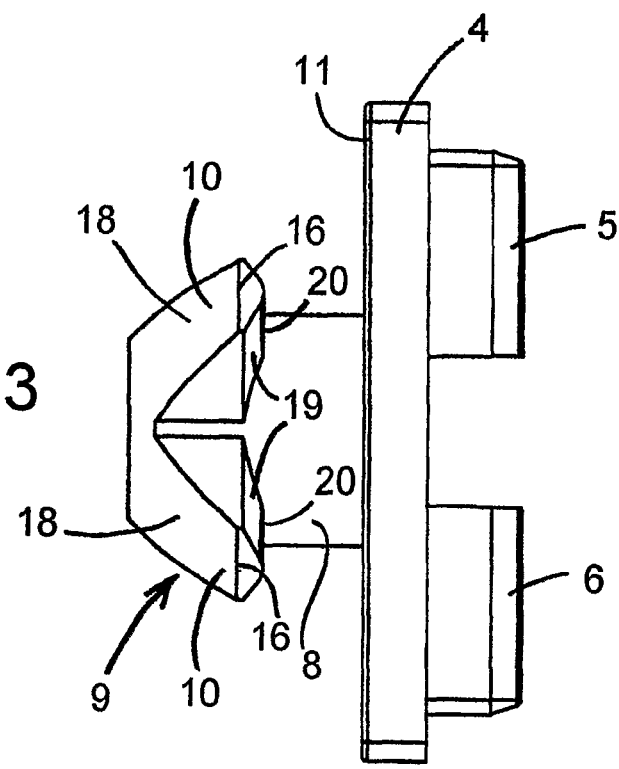
FIG. 3 is a plan view of the male fitting.
Figure 4:
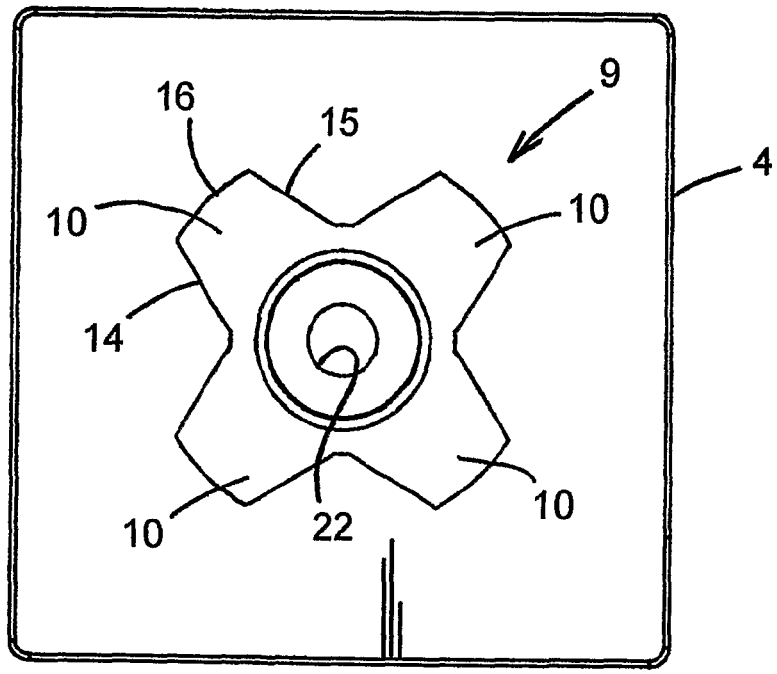
FIG. 4 is an end view of the male fitting.

One of the end fittings 3 is shown in greater detail in FIG. 2, separated from its associated beam 1, and in FIGS. 3 and 4. The end fitting is typically moulded of thermoplastic material and includes an end plate 4 which is of substantially the same external cross-sectional profile as the beam 1, i.e. square in this example. One face of the end plate 4 is provided with projections 5 and 6 to locate within the open end of the beam 1 on opposite sides of a central web 7. An opposite bearing face 11 of the end plate 4 is formed with a cylindrical stem 8 projecting axially from the centre of the plate, which in turn carries a cruciform head 9. The head 9 comprises four identical noses 10 which project radially from the stem 8 on the diagonals of the end plate 4, with only a small intervening circumferential separation between the noses. When viewed in end elevation as in FIG. 4, the opposite side faces 14 and 15 of each nose 10 converge slightly away from the stem 8 to meet a circumferential outer edge 16. When seen in side elevation as in FIG. 3, the leading face 18 of each nose is inclined towards the end plate 4, from the stem 8 to the outer edge 16. The opposite trailing face 19 of the nose is formed in a shallow V to provide a shallow radially-extending locating ridge 20 which extends substantially parallel to the end plate 4.

Referring to FIG. 2, the male fittings 3 may be secured to the beams 1 in any convenient manner, e.g. by a self-tapping screw inserted through an axial bore 22 passing through the centre of the stem 8 and engaged in an axial channel 23 which is included in the web 7.

Figure 5:
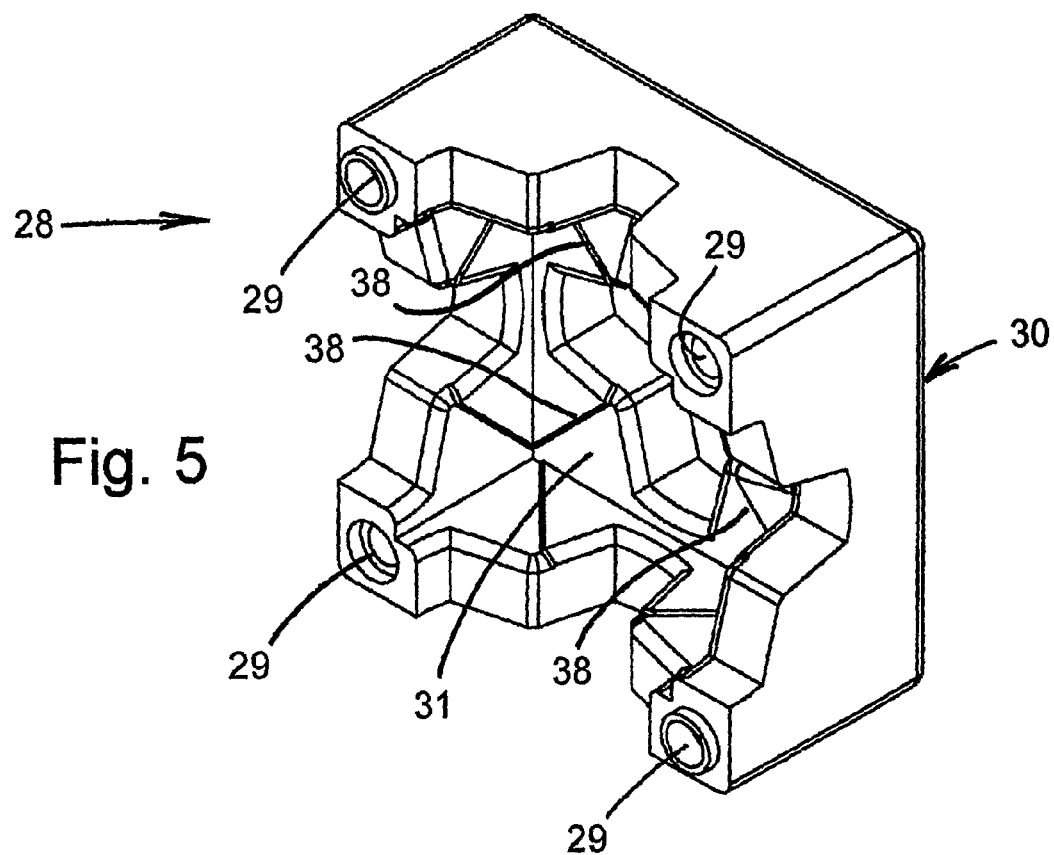
FIG. 5 is a general view of one half of a female node fitting forming a second part of the connector, showing its internal profile.
Figure 6:
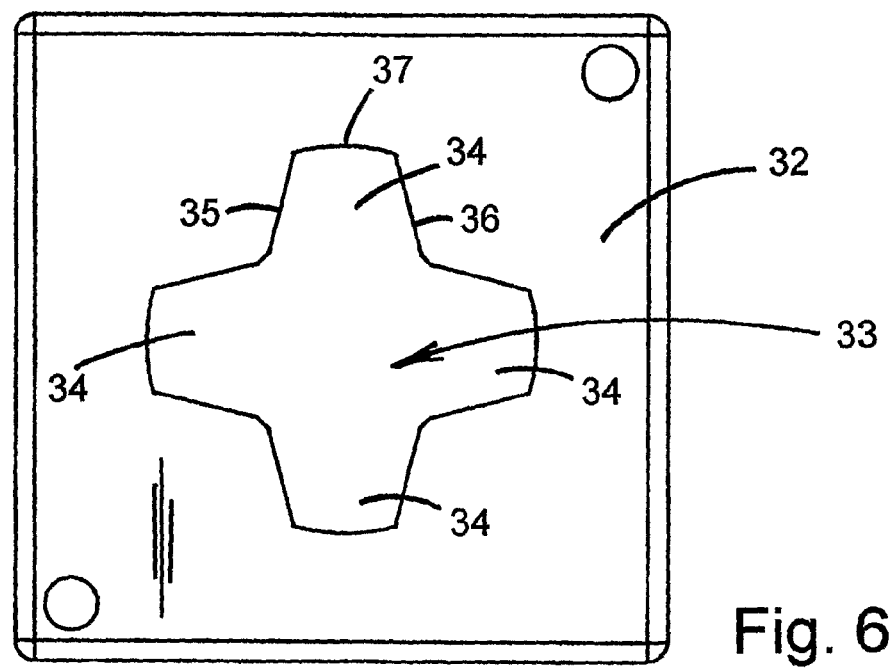
FIG. 6 is a side elevation of the node fitting.

The node fittings 2 may also be moulded of thermoplastic. For ease of moulding the node fittings may be formed in two identical halves 28, one of which is shown in FIG. 5, which may be joined together by welds or by screws, pins or other fastening elements inserted through co-operating holes 29, for example. The assembled node fitting is hollow with six square and substantially identical side walls 30. Each side wall provides an inner face 31 and an opposite outer bearing surface 32, shown in FIG. 6. The side wall contains a central generally cruciform aperture 33 which is shaped to permit the head of the male part to pass through. More particularly, the aperture 33 has four substantially identical lobes 34 which project generally perpendicular to the four surrounding side faces of the node fitting, the opposite side margins 35 and 36 of each lobe converging to meet a circumferential outer margin 37. Referring back to FIG. 5, the inner face 31 is provided with four shallow grooves 38 which extend substantially diagonally from the junction of each pair of lobes to the corner of the respective side wall.

Figure 7:
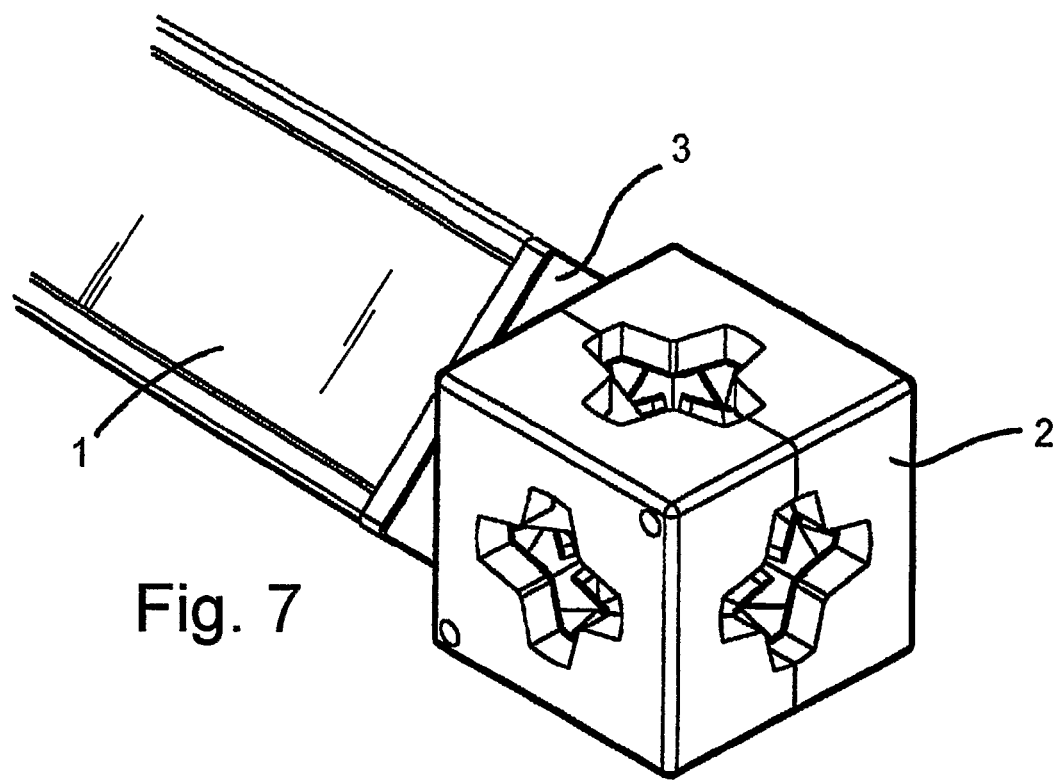
FIG. 7 is a general view of the connector during insertion of the male fitting into the node fitting.

To engage one of the beams 1 with a node fitting 2 the beam is offered up to a side wall of the node fitting in the orientation shown in FIG. 7 so that the head 9 of the male fitting can be inserted into the corresponding aperture 33 of the node fitting. When the end plate 4 contacts the outer bearing face 32 the beam is rotated through 45° into the position shown in FIG. 1, so that the four noses 10 slide against the inner face of the node fitting until the four ridges 20 click into the grooves 38 indicating that a positive lock has been achieved.

The shallow V-shaped configuration of the trailing face 19 provides a pair of oppositely-inclined ramps on opposite sides of the radial locating ridge 20, which act to provide progressive tightening and alignment of the connector as the male part is rotated within the aperture 33. Initially only a small rotational force is necessary, but the necessary force increases towards the end of rotation when the ridges 20 click into the grooves 38.

Similar oppositely-inclined ramps could be formed on the inside face of the node fitting leading into the grooves 38, but these would generally be much shallower than the ramps provided on the trailing face of the male fitting. The male fitting can of course be rotated in either direction to engage the node fitting.

The positive engagement of the four noses with the inner face of the node fitting provides the joint with greater stability and enables a firm connection to be obtained with a smaller angle of rotation and reduced engagement force. The strength of joint is less dependent on manufacturing tolerances and the connection is less likely to become slack due to wear or damage. Furthermore, since there is a choice of four possible beam orientations, if aluminium or other non-magnetic extrusions are used it is only necessary to affix steel tape to one side of the beam since the tape-covered side can be rotated into the desired position prior to engagement with the node connectors. This enables a significant reduction in manufacturing time, weight and cost to be achieved.

Figure 8:
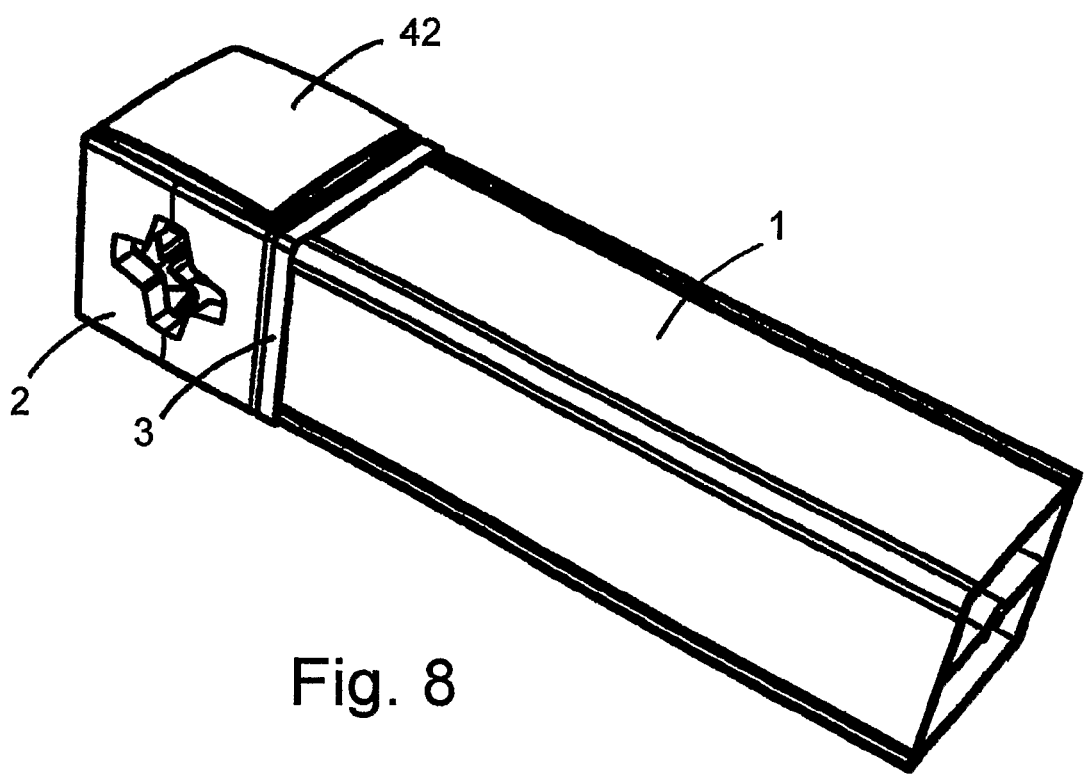
FIG. 8 is a general view of the connector with a cap applied to the node fitting.
Figure 9:
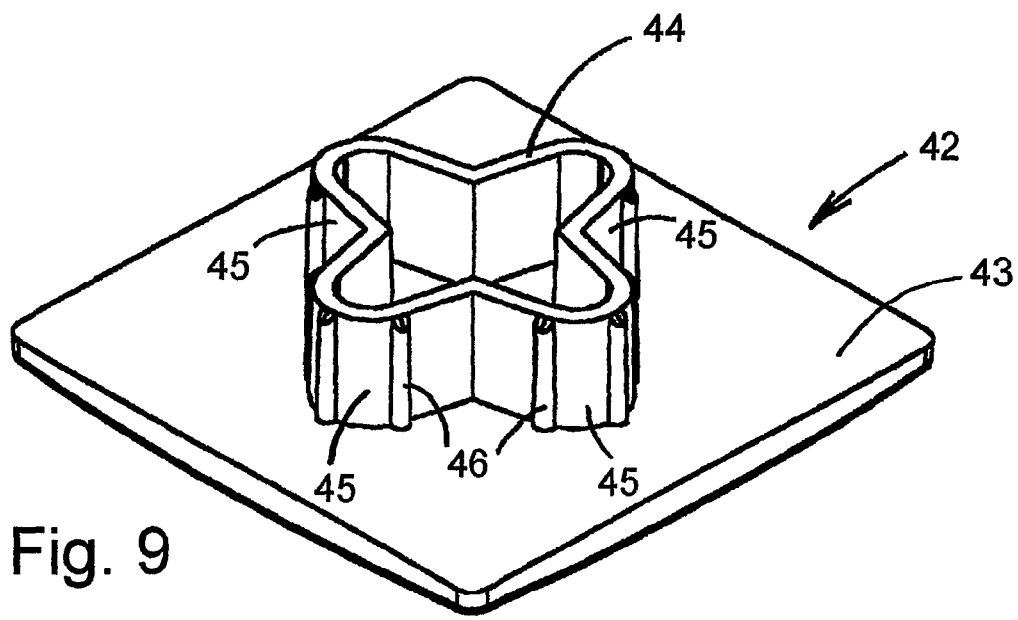
FIG. 9 is rear view of the cap.

Any unused apertures in the node fitting can be covered by a moulded cap 42, as shown in FIGS. 8 and 9, to prevent ingress of dirt and improve the overall appearance of the display. The cap includes a slightly domed square cover plate 43 with a projecting continuous wall 44 of cruciform shape to locate in one of the apertures 33. Each lobe 45 of the wall 44 is provided with external ribs 46 extending perpendicular to the cover plate 43 to form an interference fit in the apertures 33 so that the caps can be applied by an easy push-fit.

FIG. 10 shows a threaded male fitting which can be used with the node fittings. The threaded fitting is similar to the male end fittings 3, including a plate 54 formed with a cylindrical stem 58 projecting axially from the centre of the plate. The stem carries a cruciform head 59 which comprises four radially-projecting noses 60 project radially from the stem 58 on the diagonals of the end plate 54, similar in structure to the noses 10 of the end fittings 3. However, the stem 58 incorporates a screw-threaded socket 62 which opens through the plate 54 to receive a screw-threaded element (not shown). The socket may be formed by moulding or, for greater strength, by incorporating a screw-threaded bush into the moulding. When the threaded fittings are engaged with a node fitting 2 as described, accessories such as shelves, feet or other items can conveniently be attached to the frame by means of bolts or threaded studs inserted into the sockets 62.

Whilst the above description places emphasis on the areas which are believed to be new and addresses specific problems which have been identified, it is intended that the features disclosed herein may be used in any combination which is capable of providing a new and useful advance in the art.

The invention claimed is:

1. A connector for use in displays of the kind which include a display frame formed of a plurality of beams which are joined together by multi-way node fittings to form a three-dimensional shape and which have display panels releasably secured to the beams, said connector comprising:
   a male part having a bearing face, a stem fixedly connected to and projecting directly from the bearing face, and a head comprising four noses which project laterally from the stem; and
   a female part having a plurality of walls, each wall having an inner face and an outer bearing face, each of the walls containing an aperture, which permits the head of the male part to pass through the aperture and rotatably receives the stem with the bearing face of the male part in contact with the outer bearing face of the wall, the inner face of each wall being profiled to engage the said noses when the male part is rotated within the aperture, and the outer bearing face of each wall being disposed outside of the aperture of that wall;
   wherein each aperture of the female part is of cruciform shape, and the opposing faces of each wall and the noses are provided with oppositely inclined ramps which act to provide progressively tightening and alignment of the connector as the male part is rotated within the aperture in either a clockwise or counter-clockwise direction to engage the female part, the male part passing through the aperture in a first orientation and the progressive tightening occurring as the male part is rotated from the first orientation to an engaged orientation.

2. A connector according to claim 1 in which the bearing face of the male part is provided by a plate.

3. A connector according to claim 2 in which the plate is adapted to engage an end of a beam forming part of the display frame.

4. A connector according to claim 2 in which the stem contains a screw-threaded socket which opens through the plate to receive a screw-threaded element.

5. A connector according to claim 2, wherein the plate is square in plan, the noses projecting radially from the stem on the diagonals of the end plate.

6. A connector according to claim 1 in combination with a cap for engagement with an unused aperture of the female part.

7. A connector according to claim 6 in which the cap includes a cover plate and a cruciform projection for reception in said unused aperture.

8. A connector according to claim 7 in which the cruciform projection is provided with external ribs extending substantially perpendicular to the cover plate to provide an interference fit in said unused aperture.

9. A connector according to claim 1 in which the oppositely inclined ramps of the noses subtend a radially-extending locating ridge.

10. A connector according to claim 9 in which the inner face of the wall is provided with a radially-extending groove which receives the locating ridge to positively locate the male part within the female part.

11. A connector according to claim 10 further configured such that the locating ridge clicks, in use, into the groove indicating that a positive lock has been achieved.

12. A connector according to claim 1, wherein each wall of the female part is square in plan, the aperture in each wall having four substantially identical lobes which project generally perpendicular to the four surrounding side edges of its corresponding wall, the opposite side margins of each lobe converging to meet a circumferential outer margin.

13. A connector according to claim 1, wherein the female part is formed in two identical halves joined together by one or more fastening elements.

14. A connector according to claim 13, wherein each half has a cooperating hole, the one or more fastening elements being configured to be inserted through cooperating holes to join the two halves together.

15. A connector for use in displays of the kind which include a display frame formed of a plurality of beams which are joined together by multi-way node fittings to form a three-dimensional shape and which have display panels releasably secured to the beams, said connector comprising:
   a male part having a bearing face, a stem fixedly connected to and projecting directly from the bearing face, and a head comprising four noses which project laterally from the stem; and
   a female part having a wall with an inner face and an outer bearing face, the wall containing an aperture which permits the head of the male part to pass through the aperture and rotatably receives the stem with the bearing face of the male part in contact with the outer bearing face of the wall, the inner face of each wall being profiled to engage the noses when the male part is rotated within the aperture, and the outer bearing face of the wall being disposed outside of the aperture;
   wherein the aperture of the female part is of cruciform shape and the inner face of the wall is profiled to provide progressive tightening and alignment and to engage said noses when the male part is rotated in either a clockwise or a counter-clockwise direction, the male part passing through the aperture in a first orientation and the progressive tightening occurring as the male part is rotated from the first orientation to an engaged orientation.

16. A connector according to claim 15 in which the bearing face of the male part is provided by a plate.

17. A connector according to claim 16 in which the stem contains a screw-threaded socket which opens through the plate to receive a screw-threaded element.

* * * * *